United States Patent Office 2,925,344
Patented Feb. 16, 1960

2,925,344

SPICE CONCENTRATE

Maclyn R. Peat, Chicago, Ill., assignor to Wm. J. Stange Co., Chicago, Ill., a corporation of Illinois No Drawing. Application December 12, 1957
Serial No. 702,244

10 Claims. (Cl. 99—140)

This invention relates to spice concentrates containing spice extractives.

Spice extractives include essential oils (usually prepared by steam distillation) and oleoresins (usually obtained by solvent extraction). Such spice extractives are well known in the art but are not often employed as such because of certain disadvantageous features. Thus, spice extractives usually are not miscible with the product to be seasoned or flavored or colored and the very small fractions of a percent of a spice extractive employed to season or flavor or color a food product are, as a rule, extremely difficult to disperse completely and uniformly in the food product. The small quantities of the usually liquid or pasty or oily spice extractives are difficult to measure and dispense accurately.

For the reasons indicated, it has been customary to disperse spice extractives on soluble edible carriers such as salt, dextrose and sugar. Ordinarily, the concentration of the spice extractives in a spice extractives-carrier mixture of the type indicated runs about five to six percent. This very low concentration means a high bulk and weight in view of the spice extractive content, with resultant high expenses for containers, freight, storage and handling. The salt or sugar used as a carrier will influence the flavor of the end product and this fact must be taken to account in formulating the end product. The soluble carrier will dissolve almost immediately when introduced into a wet batch of end product to be seasoned or flavored, which tends to reduce the extent of distribution of the spice extractive in the end product. In other words, the spice extractive is no longer as finely subdivided and therefore as widely distributed as before the dissolution of the carrier. Or else the carrier is dissolved before maximum distribution has been effected.

The invention of the present application is a spice concentrate having the form of a free flowing fine powder. Specifically, the compositions of the present invention are spice extractives absorbed on a finely divided edible carrier insoluble in water.

The carrier of the present invention provides a very great surface area on which the spice extractives are dispersed, probably in the form of an extremely thin film. The concentration of spice extractives in the extractive-carrier mixture may range up to about seventy-five percent. Thus, in place of using for instance, ninety-five pounds of salt or sugar to carry five pounds of spice extractive, I may use as little as one and two-thirds pounds of a carrier such as finely divided calcium silicate to absorb and carry an identical amount of spice extractive. The cost of containers, freight and warehouse space can then be reduced to about ten percent of the corresponding costs incurred when conventional soluble carriers are used. Much larger amounts of spice extractives can be processed in the mixing equipment used in preparing spice compositions including soluble carriers. Further the stability with respect to flavor and color of spice extractives absorbed on a carrier such as finely divided calcium silicate is almost equal to the stability of the original spice extractives. This is in contrast to the lack of stability when the same spice extractives are absorbed on soluble carriers such as salt or sugar which create conditions leading to flavor and color changes of spice extractives. Further, the spice concentrates of the present invention are dispersed in such fashion in food products flavored or seasoned or colored therewith that a predetermined flavor and/or color intensity can be obtained using slightly less spice extractives as compared with the case when either straight undiluted spice extractives or extractives spread on a soluble carrier are used. It is possible that this effect is due to the maintenance of the spice extractives as a very thin film on small opaque insoluble carrier particles. My compositions are easily handled, measured, dispensed and dispersed in the end products and generally are exceedingly economical in use without sacrifice of any desirable properties.

On microscopic inspection of the effect of water on spice extractives dispersed on a soluble carrier, it has been noted that as the carrier particles are dissolved, the spice extractives coalesce to form droplets which may include the spice extractives originally distributed over one or several soluble carrier particles. On the other hand, water has no effect on spice concentrates of the present invention wherein the spice extractives remain distributed over the insoluble carrier particles.

The water insoluble edible carriers of the present invention are finely divided organic or inorganic materials such as cellulose, tricalcium phosphate, calcium silicates, calcium carbonate, magnesium carbonate, magnesium silicates, sodium silicoaluminate, sodium calcium silicoaluminate, silica alumina, and the like. The fineness is ordinarily at least —325 mesh or —400 mesh. In other words, the particle size is less than 44 or 37 microns and the ultimate particle size is less than 5 microns, i.e. from 2 or 3 to from 0.01 to 0.05 micron. The last figure (0.01 to 0.05 micron) applies, for instance, to commercially available sodium and sodium calcium silicoaluminates and to synthetic calcium and magnesium silicates.

The preferred carrier of the present invention is a calcium silicate containing calcium oxide and silica in a molecular ratio ranging from about 1:2 to about 1:4. Further, this calcium silicate carrier is characterized by an average ultimate particle size of less than 0.1 micron and a surface area of more than about ten square meters per gram. I prefer to use a calcium silicate carrier containing calcium oxide and silica in the molecular ratio of about 1:2 and having an average ultimate particle size of about 0.01 to 0.04 micron and a surface area of 75 to 150 square meters per gram. Such calcium silicate powders are available commercially, being made by a hydrothermal reaction of diatomaceous earth with a source of calcium or by a precipitate forming reaction between a soluble silicate and a soluble calcium salt.

In the preparation of my spice concentrate I mix the above disclosed carrier for instance, calcium silicate, with a spice oleoresin and/or essential oil. Examples of such spice oleoresins and/or essential oils are the liquid flavoring princples of paprika, black and white pepper, turmeric, sage, celery, cinnamon, ginger, nutmeg, thyme, coriander, pimento, mace, marjoram, mustard, caraway, cassia, cardamon and cloves. These spice oleoresins and essential oils may be prepared by any suitable conventional methods.

The ratio of carrier to spice oleoresin and/or essential oil is such as to yield a mixture constituting a free flowing powder. Ordinarily, as much as two and sometimes three parts by weight of spice oleoresin and/or essential oil may be mixed with about one part of calcium silicate carrier. If desired, a smaller amount of liquid spice flavoring principle may be combined with the calcium silicate carrier, for instance, equal parts by weight, Specific examples of compositions according to the present invention have been prepared as follows. The carrier was a calcium silicate having the following analysis:

| | Percent by weight |
|---|---|
| Ignition loss, 1800° F. | 18.0 |
| CaO | 25.3 |
| $SiO_2$ | 51.7 |
| $Al_2O_3$ | 1.8 |
| $Fe_2O_3$ | 0.9 |
| $Na_2O$—$K_2O$ | 0.5 |

This material contained 5.0 percent free moisture and had a pH of 8.3. It was further characterized by a loose weight density of 4.5 pounds per cubic foot, a wet density of 9.0 pounds per cubic foot, a specific gravity of 2.45, a surface area of about 95 square meters per gram, and an average ultimate particle size of 0.02 micron. Not more than about one percent of this material was retained on a 325 mesh screen. This material was prepared by combining lime with diatomaceous silica and water at elevated pressure and temperature. The resulting slurry was filtered, dried and ground to the above mentioned particle size.

The above calcium silicate was mixed with the oleoresin of black pepper in a ratio of 1:3; with the oleoresin of turmeric in a ratio of 35:65; with the oleoresin of red pepper in a ratio of 35:65; with the oleoresin of celery in a ratio of 35:65; and with the oleoresin of paprika in a ratio of 3:7. The resulting mixtures were free flowing powders. In these products, the spice oleoresins were as stable, or somewhat more stable, with respect to color and/or flavor as the same spice oleoresins when absorbed on other carriers. The flavor strength, based on the spice oleoresin content, was greater than when the same amount of spice oleoresin was mixed with another carrier (such as salt in a ratio of 1:19), particularly in the case of the oleoresin of black pepper where the flavor strength was at least ten percent greater when using the calcium silicate carrier. Similarly, in the case of turmeric and paprika the color was at least five to ten percent greater when the calcium silicate carrier was used, as compared with the same amount of spice oleoresin absorbed on another carrier.

I have also prepared spice concentrates using as a carrier a finely divided (—325 or —400 mesh) anhydrous calcium carbonate. The oleoresins of black pepper, paprika and turmeric were mixed with this carrier, at carrier:oleoresin ratios, respectively, of 79.2:20.8, 76.5:23.5 and 83.1:16.9, to form free flowing powders. Similarly, spice concentrates were prepared using as a carrier a finely divided (—325 or —400 mesh) tricalcium phosphate. The oleoresins of black pepper, paprika and turmeric were mixed with this carrier, at carrier:oleoresin ratios, respectively of 7:3, 68.9:31.1 and 71.5:28.5, to form free flowing powders.

My novel spice concentrates are characterized by a number of important advantages, as compared with conventional spice products containing at most about six percent of spice oleoresin and/or essential oil absorbed on a soluble carrier such as salt or sugar. In my novel spice concentrate, the spice oleoresin and/or essential oils may be ten times as concentrated as in the above noted conventional products. There are important savings due to the much smaller quantities of carrier needed, the greatly reduced space required for storing my novel product and the savings in shipping containers, freight and storage costs. My novel spice concentrates often are almost as concentrated as undiluted spice oleoresins and/or essential oils. But my novel spice concentrates are much more easily handled and measured than straight oleoresins and/or essential oils and need not be stored and shipped in stainless steel drums, as is necessary in the case of some spice oleoresins. Further, my novel product is easily blended or mixed with dry or liquid ingredients of foods or of spice mixes. Further, due to the small content of carrier, my spice concentrates do not add unnecessary weight to any food product with which it may be incorporated, which may be an important factor, particularly in products such as soup mixes. No calories and little or no sodium is added to a food product flavored with my spice concentrate.

The spice concentrates of the present invention are easily incorporated with foods, to give excellent distribution in the food of the spice extractive, and this distribution is maintained during the storage of the food. By way of an example, I have prepared a spaghetti sauce having the following composition:

| | Percent |
|---|---|
| Tomato paste | 28⅓ |
| Sugar | 2½ |
| Starch | 3⅓ |
| Water | 59⅓ |
| Salt | 1⅓ |
| Seasoning | 1 |
| Margarine or edible oil | 4.16 |
| | 100.00 |

The seasoning included ⅟₁₆ paprika oleoresin. I found that the same flavor and the same color value (35,000) could be effected by using ⅟₂₈ of paprika oleoresin on a calcium silicate carrier at a oleoresin:carrier ratio of 7:3. Similar results have been obtained when seasoning or flavoring other foods wth the spice concentrates of the present invention.

Many details may be varied within a wide range without departing from the principles of this invention and it is therefore not my intention to limit the patent granted on this invention otherwise necessitated by the scope of the appended claims.

The invention is claimed as follows:

1. A dry, free-flowing spice concentrate for use in coloring and flavoring comestibles comprising: a spice principle; and a finely divided, edible, water-insoluble material selected from the class consisting of calcium silicate, tricalcium phosphate, calcium carbonate, magnesium carbonate, magnesium silicate, sodium silicoaluminate, sodium calcium silicoaluminate, silica and alumina, which material carries said spice principle.

2. A spice concentrate according to claim 1 wherein said water-insoluble material has a particle size of less than 44 microns.

3. A food comprising, by way of seasoning, a spice concentrate including a spice principle; and a finely divided, edible, water-insoluble material selected from the class consisting of calcium silicate, tricalcium phosphate, calcium carbonate, magnesium carbonate, magnesium silicate, sodium silicoaluminate, sodium calcium silicoaluminate, silica and alumina, which material carries said spice principle, said spice concentrate being dispersed throughout said food.

4. A spice concentrate comprising calcium silicate having a calcium oxide to silica ratio of about 1:2 to 1:4, an average ultimate particle size less than 0.1 micron and a surface area of more than about ten square meters per gram; and with a liquid spice flavoring principle carried by said calcium silicate, said concentrate being a free flowing powder.

5. A spice concentrate comprising calcium silicate having a calcium oxide to silica ratio of about 1:2 to 1:4, an average ultimate particle size less than 0.1 micron and a surface area of more than about ten square meters per gram; and a liquid spice flavoring principle carried by said calcium silicate, said concentrate being a free flowing powder, such spice concentrate including from about two to about three parts by weight of said liquid spice flavoring principle for each part of calcium silicate.

6. A spice concentrate according to claim 4 in which said spice flavoring principle is oleoresin of turmeric and in which the ratio of said calcium silicate to said oleoresin is 35:65.

7. A spice concentrate according to claim 4 in which said spice flavoring principle is oleoresin of red pepper and in which the ratio of said calcium silicate to said oleoresin is 35:65.

8. A spice concentrate according to claim 4 in which said liquid spice flavoring principle is oleoresin of celery and in which the ratio of said calcium silicate to said oleoresin is about 35:65.

9. A spice concentrate according to claim 4 in which said liquid spice flavoring principle is oleoresin of paprika and in which the ratio of said calcium silicate to said oleoresin is about 3:7.

10. A spice concentrate according to claim 4 in which said spice flavoring principle is oleoresin of black pepper and in which the ratio of said calcium silicate to said oleoresin is 1:3.

References Cited in the file of this patent

UNITED STATES PATENTS

| | | |
|---|---|---|
| 1,978,040 | Daitz | Oct. 23, 1934 |
| 2,284,822 | Heller | June 2, 1942 |
| 2,555,465 | Bogin et al. | June 5, 1951 |
| 2,768,899 | Waldo | Oct. 30, 1956 |

FOREIGN PATENTS

| | | |
|---|---|---|
| 26,038 | Australia | Nov. 20, 1925 |

UNITED STATES PATENT OFFICE
CERTIFICATE OF CORRECTION

Patent No. 2,925,344                                             February 16, 1960

Maclyn R. Peat

It is hereby certified that error appears in the printed specification of the above numbered patent requiring correction and that the said Letters Patent should read as corrected below.

Column 1, line 64, for "waresouse" read -- warehouse --; column 2, line 59, for "princples" read -- principles --; column 4, line 62, strike out "with".

Signed and sealed this 26th day of July 1960.

(SEAL)
Attest:

KARL H. AXLINE
Attesting Officer

ROBERT C. WATSON
Commissioner of Patents